Figure 5:
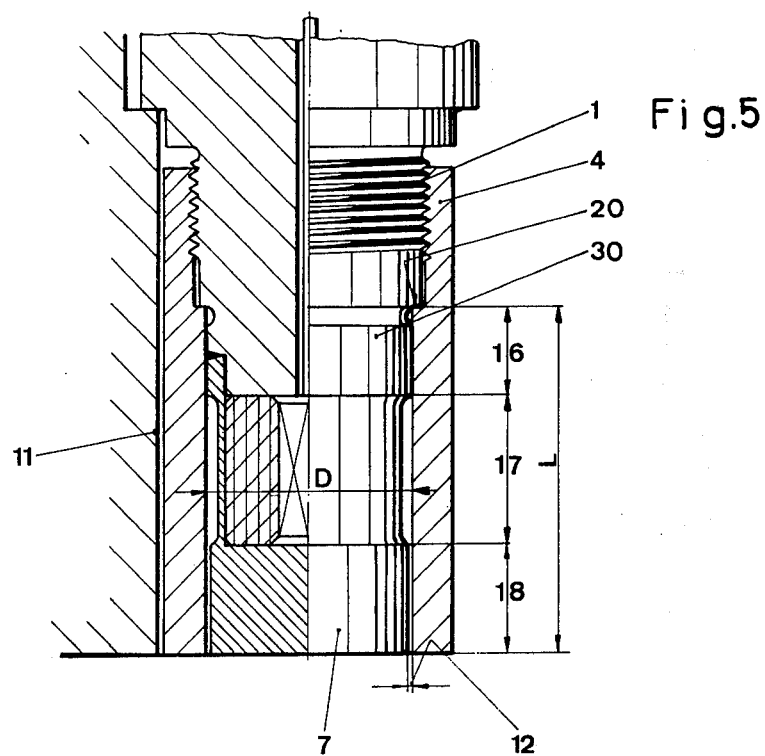

United States Patent [19]

Engeler et al.

[11] 4,059,999
[45] Nov. 29, 1977

[54] PRESSURE TRANSDUCERS FOR PLASTIC SUBSTANCES

[75] Inventors: Paul Engeler, Oberohringen; Hans Ulrich Baumgartner, Winterthur; Ulrich Dübendorfer, Bassersdorf; Hans Conrad Sonderegger, Neftenbach, all of Switzerland

[73] Assignee: Kistler Instrumente AG, Switzerland

[21] Appl. No.: 574,337

[22] Filed: May 5, 1975

[30] Foreign Application Priority Data

May 3, 1974 Switzerland .................... 006020/74

[51] Int. Cl.² ............................ G01L 7/16; G01L 9/08
[52] U.S. Cl. .................................... 73/419; 73/398 R
[58] Field of Search ................. 73/398 R, 88.5 SD, 4, 73/395, 419

[56] References Cited

U.S. PATENT DOCUMENTS

| | | | |
|---|---|---|---|
| 3,031,591 | 4/1962 | Cary et al. | 73/398 R |
| 3,171,989 | 3/1965 | Hatschek | 73/398 R |
| 3,521,491 | 7/1970 | Limbach | 73/395 |
| 3,521,492 | 7/1970 | Baltakis | 73/398 R |
| 3,628,381 | 12/1971 | Ardnow | 73/398 R |
| 3,672,223 | 6/1972 | Spescha | 73/398 R |

*Primary Examiner*—Donald O. Woodiel
*Attorney, Agent, or Firm*—Craig & Antonelli

[57] ABSTRACT

A transducer for measuring the pressure characteristics of elastic material to be injection moulded includes a transducing element contained within a sleeve member mounted in an injection moulding device. An end of the sleeve member adjacent the material whose pressure characteristics are to be measured contains a pressure transmitting element for transmitting the pressure characteristics of the injection moulded material to the transducing element. Support and guiding structure is provided for supporting the transducing and pressure transmitting elements in the sleeve member, and for maintaining a uniform spacing of the pressure transmitting element from the internal wall of the sleeve member.

35 Claims, 6 Drawing Figures

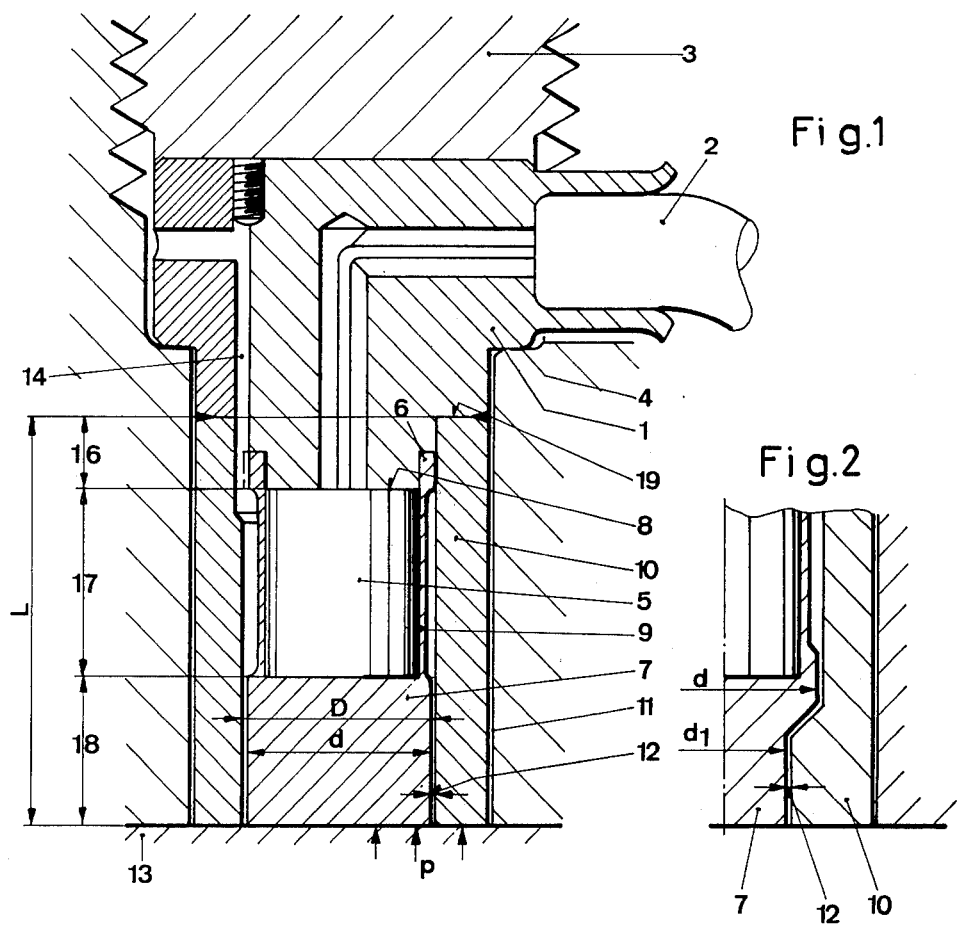
Fig.1
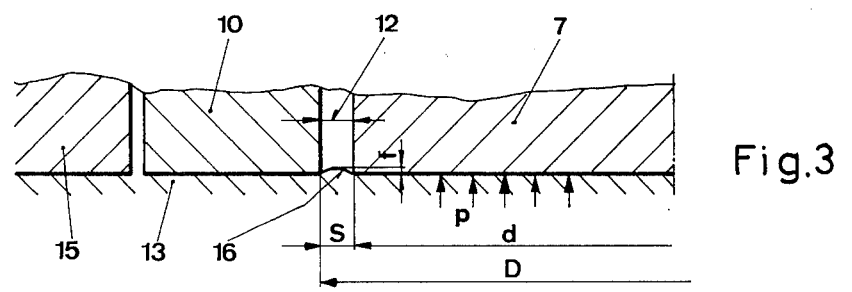
Fig.2
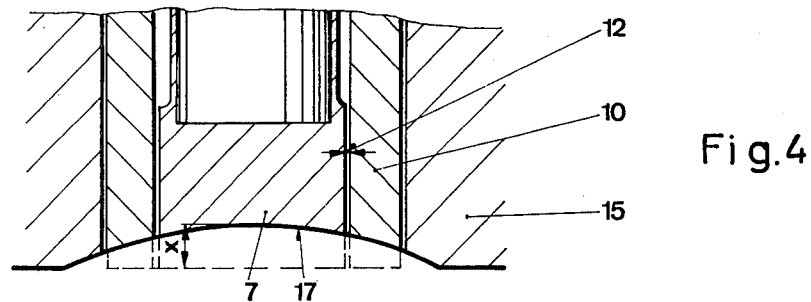
Fig.3
Fig.4

PRESSURE TRANSDUCERS FOR PLASTIC SUBSTANCES

The present invention relates to pressure transducers for electrical measurement of pressure behavior during injection moulding of plastics and rubber. A large proportion of today's useful articles are made of rubber or plastics, produced by injection moulding under high pressure and temperature. The mould employed is usually of metal, consisting of more than one section, and is mounted in a moulding machine. In some cases, extrusion dies which are movable in relation to each other are also used.

The injection moulding and extrusion machines now in use are largely automated. Recently, such machines have been equipped with process computers, enabling a continuous operation under optimal conditions for the workpieces or articles to be made. Such computers have made it possible to determine the optimal filling quantity for each workpiece every time, allowing continuous operation without supervision by skilled personnel.

The process computer controls the machine on the basis of pressure, temperature and force measurements which are monitored and evaluated continuously. Particularly with exacting, intricate workpieces, it has been found that monitoring the pressure behavior during the injection moulding or extrusion operation is essential if workpieces with repeatedly accurate dimensions and characteristics are to be obtained. To achieve this, pressure transducers are mainly disposed at various points in the mould so that the front parts of the transducers are completely flush with the inner surface of the mould. It is, however, also possible to position the transducers in the nozzle of the moulding machine, although there is then no indication of the pressure distribution at critical points on the workpiece.

For these reasons, it is considered beneficial to fit pressure transducers directly into the moulds and dies. After completing a production run, the moulds with the transducers in position are put into storage until the same article is to be produced again. The process computer thus controls the machine according to a predetermined program, with the aid of the data measured at the temperature and pressure measuring points. In this way the required workpiece can be immediately produced again with the same tolerances and strength values, even after an interval of months, without any preliminary trials. Moreover, no highly paid skilled personnel is needed to get a second run started. By using injection moulds with permanently fitted monitoring elements at measuring points, which can be quickly connected to the control system of the machine, interruptions of work on expensive injection moulders are minimized, thereby bringing further savings on costs.

Pressure transducers for such demands must meet exacting requirements for continuous operation, repeatability, size, ambient temperature, etc. Owing to their size, the pressure transducers now available commercially for injection moulding can be fitted only at the nozzle of the machine. These commercially available transducers are too big for fitting into the moulds. Furthermore, their measuring systems cannot tolerate temperatures exceeding 80° C, because they are usually built on the operational basis of strain gauges. With these commercial pressure transducers, it is therefore necessary to separate a diaphragm part which is exposed to temperatures over 200° C from the measuring system, so that the necessary temperature difference can be obtained between the two parts. Examples of such transducers are found in the German Pat. Nos. 1,698,137, 1,936,528, 1,936,887 and 2,211,609. All these designs have resorted to complicated methods in order to eliminate as far as possible the influence of the necessary temperature differences on the pressure measurement.

Other methods are known, however, whereby force transmitting pins, similar to ejector pins, are fitted in the mould and connected to a force measuring cell. The ends of the pins are disposed flush with the surface of the mould. These pins vary in length and diameter according to the size of the mould, and are guided into fitted holes in the moulds. Owing to undefined lateral support, the clearance between hole and pin has to be very small. This means that the slightest distorsion of the mould exposed to high temperatures causes friction and sticking of pins, thereby leading to substantial and erratic errors in the transmitted force measurement. This method of measuring is therefore unsuited for reliable measurements.

By comparison the pressure transducers in accordance with this invention have a much simpler design. The measuring unit is in the form of a cylindrical element placed immediately behind the part where the pressure is to be measured. Such a unit can withstand temperatures above 200° C and is very rigid in construction.

The measuring system may be active or passive. Piezoelectric transducers are particularly suitable on account of their small susceptibility and sensitivity to temperature. However, there are also piezoresistive, inductive, capacitive and other measuring devices which would be suitable for pressure transducers in accordance with the invention.

The pressure transducer embodying the invention is shown without limitation in six illustrations, viz.:

FIG. 1: A cross section of a pressure transducer in accordance with the invention in the fitted state.

FIG. 2: A modified embodiment of FIG. 1.

FIG. 3: The frontal surface of the pressure transducer with the moulding plastics, on a very enlarged scale.

FIG. 4: The diaphragm part of the pressure transducer machined to match the inside shape of the moulding tool.

FIG. 5: Cross-section of a modification of the pressure transducer according to the invention.

Figure 6:
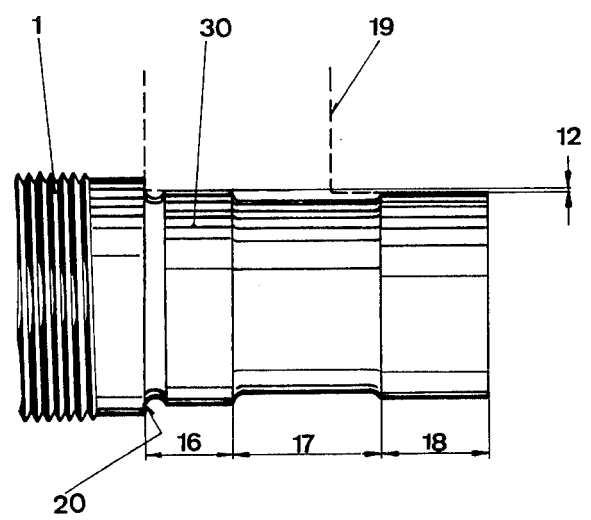

FIG. 6: View of another measuring element fitted in the pressure transducer according to the invention.

As shown in FIG. 1, the pressure transducer consists of the housing 1 to which a screened or insulated connecting cable 2 may be joined with known connector means. The housing 1 is pressed onto the bearing surfaces 4 by means of the fitting screw 3. The measuring unit 5 is centered by the elastic clamping sleeve 6 and braced against the plane surface 8 of the housing 1 by the pressure piston 7 or diaphragm.

Owing to the narrowed portion 9, the clamping sleeve 6 is very elastic, consequently, the pressure $p$ of the plastic mass is transmitted almost completely via the measuring unit 5 onto the transducer housing 1. The measuring system is susceptible to lateral forces and is enclosed by the sleeve 10, which is joined rigidly to the housing 1. The outside diameter of the sleeve 10 is dimensioned so that it can be inserted in the hole 11 virtually without clearance. The inside diameter D of the sleeve 10 and the diameter $d$ of the pressure piston 7 are matched to each other so that a predetermined amount of uniform radial clearances 12 result. According to experience, such clearances should be less than 20 micrometers ($\mu$m).

The annular gap 12, which is formed by these clearances, is not sealed off with a metal diaphragm. Instead, the plastic mass 13 itself forms a membrane over this very fine gap, without penetrating into the gap, so that a sealing gap results between the pressure piston 7 and the sleeve 10. The exactly centered sleeve 10 needs to be cylindrical only on the inside diameter D, according to the invention, and its outer cross section might be □-shaped. The only essential condition is that the sleeve 10 must be rigid so that it is not deformed when mounted, otherwise the pressure piston 7 might touch the wall of the sleeve, which must be avoided.

To ensure high concentricity of the very fine sealing gap 12, the measuring device consisting of the pressure piston 7 and measuring unit 5 should be made as short as possible. With the clamping sleeve 6 in the form of a thin-walled, highly elastic tube, the measuring unit 5 is sealed in completely.

To prevent pressure building up in the space within the fine annular gap 12, which may possibly falsify the measurement, an air vent hole 14 may be provided although other means of connecting the gap space to atmosphere are also possible.

FIG. 2 shows a modification of FIG. 1. The pressure piston 7 has a reduced diameter from $d$ to $d_1$ at the surface of the mould, and the sleeve 10 is correspondingly reinforced at this area by a flange portion. The critical annular gap 12 is maintained at this area of reduced diameter of the pressure piston 7. In this way, the force to be measured can be adapted largely to the capacity of the measuring cell. Often it is desirable that the frontal or facing area of the transducer to the plastic mass 13 should be as small as possible. In that case, the outside diameter of the sleeve 10 could also be reduced.

FIG. 3 shows the front part of a pressure transducer in accordance with FIG. 1 which is greatly enlarged. The annular gap 12 between pressure piston 7 and tubular sleeve 10 is bridged by the plastic mass 13. This mass penetrates to a depth $f$, which is less than the gap width S, preferably substantially less. This behavior is explained by the rapid cooling of the hot plastic mass against the water-cooled walls of the injection mould 15. When the cooled mass, i.e., the mould plastic mass 13, is expelled, the burr 16 is carried away with it. This burr 16 is found as a fine ring on the surface of the workpiece.

In special cases, it may occur that the pressure behavior is required to be measured at points on surfaces having no plane surface at right angles to the transducer axis. As shown in FIG. 4, the front part of the pressure transducer, i.e., the pressure piston 7, in accordance with the invention, may be modified by machining to a certain dimension X. The function of the transducer is not impaired by such shaping in any way. During machining, because of lateral elasticity, the pressure piston 7 may shift towards the sleeve 10 until it touches the wall, but it will move back into the central position again afterwards. It is advisable to finish the new surface 17 by grinding. The annular or sealing gap 12 may be covered over by a grinding burr, but the bypassing force resulting from this burr is negligible. The piston of the transducer may be machined on its front surface either separately or in the installed state.

FIG. 5 shows an arrangement wherein the exactly centered sealing gap, according to FIG. 1, can be achieved and maintained. The protecting and centering sleeve 10 can, for example, be drawn onto a fixed stop 20 of the body 1 with the threaded part 4. An axial preload can be achieved by other means also, however, as shown in FIG. 1 by the fitting screw 3.

The sleeve 10 is centered by the fitting or mating portion 16 of the measuring device 30. The measuring device 30 is joined securely to the body 1 with known means, and has three carefully machined cylindrical portions which ensure exact radial distribution of the minimum annular gap 12 of only a few $\mu$m, so that the portion of the pressure piston 7, which can be integrally formed with the unit 30, does not touch the wall at any point. These portions are the fitting portion 16, the measuring portion 17 in which the measuring element 30 is placed under elastic preload, and the sealing portion 18 of the pressure piston 7 with the exactly toleranced sealing gap 12, bounded by the cylindrical surface of the centering sleeve 10 having a diameter D.

The arrangement described might also be employed in succession, in accordance with the invention, by using a measuring unit 30 preloaded with a central means, such as a screw body 1, and the element 30. In all cases, however, the sealing zone 18 and measuring zone 17 must be made short, in order to bring the subsequent fitting zone 16 with the stop 20 as close to the sealing zone 18 as possible. It has been found that preferably the ratio of the length L of the measuring device 30 to the diameter D of the centering sleeve 10 should be less than 3 : 1. The invention is not limited to this dimension however.

FIG. 6 shows a typical arrangement assuring a high-precision sealing cap 12, according to the invention. The body 1 with the fully assembled measuring device 30 is mounted on a machine tool, preferably a circular grinding machine, after which the fitting zone 16 with stop 20 and (after adjusting the rest by the specified gap width 12) the sealing zone 18 are machined in one chucking. In this way, only the difference, and not an absolute dimension, has to be adjusted on the machine tool, and this can be done with great accuracy.

Calibration of the pressure transducer during operation is no longer necessry. If it should nevertheless be required, the transducer can be mounted on a hydraulic testing device with an adapter. The plane front portion should first be sealed with adhesive film to provide the diaphragm function. Alternatively, a simple calibration is possible by introducing force onto the pressure piston 7 with a force measurement testing device, but this calls for great care.

The invention makes it possible for the first time to measure the pressure behavior directly on the workpiece during the injection moulding operation. In this way, many new possibilities have been opened up for the automation of plastics and rubber injection moulding and extrusion machines. The geometry of the transducer, which may for example conform to that of a standard ejector pin, as used in the plastics industry, with the measuring element fitted directly into the front part and protected by a strong centering sleeve, together with the described arrangements for obtaining an exactly toleranced and centered sealing gap, results in a miniaturized, high-precision measuring tool. This tool can be constructed to be fitted very simply in standard holes of a size 4 mm or less. It thus represents a considerable advance over the present state of the art.

The known errors, resulting from thermal shock, which occur when the hot plastic mass comes into contact with the usual metallic diaphragms, is not detectable with the arrangement of the invention. Finally, the ability to machine the front portion of the transducer to which this invention relates facilitates installation, and enables the transducer to be disposed in locations where previously ruled out. In this way, the techniques in accordance with the invention enable pressure transducers to be produced which for the first time can be disposed directly into even small injection moulds. By dispensing with complicated diaphragms, sticking pressure plugs, complicated temperature compensation systems etc. of the prior art, these transducers permit accurate, hysteresis-free and repeatable measurements of pressure behavior during injection moulding of plastic substances in a continuous operation, thereby opening up new technical possiblities.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A transducer for measuring pressure characteristics of elastic material in an injection moulding device, said transducer comprising:
   a hollow sleeve member having an inner peripheral wall,
   first means arranged in said sleeve member for measuring pressure of a pressure medium,
   second means arranged at a first end of said sleeve member for transmitting pressure characteristics to said first means, and
   third means for radially and axially supporting said first and second means within said sleeve member,
   wherein said second means is arranged concentrically within said hollow sleeve member with a sealing gap between said second means and the inner wall of said hollow sleeve member, said sealing gap being of a predetermined size so that said gap in cooperation with the elastic material of said pressure medium forms a seal for sealing said first means within said hollow sleeve member from said pressure medium.

2. A transducer according to claim 1, wherein said hollow sleeve member has a cylindrical inner peripheral wall.

3. A transducer according to claim 2, wherein said first means includes a cylindrical force-sensitive means, and said second means includes a cylindrical member such that said sealing gap is a concentric annular gap with said inner peripheral wall.

4. A transducer according to claim 3, wherein said third means includes a clamping means for clampingly fixing said force-sensitive means to said cylindrical member of said second means under an axial prestress.

5. A transducer according to claim 4, wherein said clamping means further seals said force-sensitive means.

6. A transducer according to claim 5, wherein said force-sensitive means includes at least one piezoelectric element.

7. A transducer according to claim 3, wherein said third means includes a cylindrical housing structure secured to said cylindrical force-sensitive means, said housing structure and said force-sensitive means being configured to axially and radially position said force-sensitive means within said hollow sleeve member.

8. A transducer according to claim 7, wherein said cylindrical member of said second means is integrally joined to said cylindrical force-sensitive means, said annular sealing gap being defined by the configurations of said housing structure and said force-sensitive means with said inner wall of said hollow sleeve member.

9. A transducer according to claim 7, wherein said housing structure is arranged to maintain said force-sensitive means under an axial prestress.

10. A transducer according to claim 7, wherein said force-sensitive means includes at least one piezoelectric element.

11. A transducer according to claim 3, wherein said cylindrical member of said second means includes a surface through which pressure characteristics are applied, said surface having a predetermined shape matching the inner surface of a container for said pressure medium.

12. A transducer according to claim 3, wherein said cylindrical member of said second means has a first diameter at said first end of said sleeve member smaller than a diameter adjacent said force-sensitive means, and wherein said sleeve member is provided with means for maintaining said annular sealing gap at said predetermined size for sealing said first means from said pressure medium.

13. A transducer according to claim 12, wherein said predetermined size is less than 20 $\mu$m.

14. A transducer according to claim 1, wherein said predetermined size of said sealing gap is maintained at a dimension less than 20$\mu$m.

15. A transducer according to claim 1, wherein means are provided for communicating said sealing gap within said sleeve member with atmospheric pressure.

16. A transducer according to claim 1, wherein first means includes at least one piezoelectric element being insensitive to temperature.

17. A transducer according to claim 1, wherein first means is a force-sensitive means.

18. A transducer according to claim 2, wherein said first, second and third means are integrated into a single cylindrical structure contained within said sleeve member, said cylindrical structure including in axial sequence a fitting portion for radially centering said structure, a measuring portion for measuring said pressure, and a portion for transmitting said pressure characteristics and for defining said sealing gap with said sleeve member and to seal said integrated structure within said sleeve member.

19. A transducer according to claim 18, wherein said fitting portion has a diameter D corresponding to the diameter of said inner peripheral wall of said sleeve member.

20. A transducer according to claim 19, wherein each of said fitting portion, said measuring portion and said sealing portion has an approximately equal axial length.

21. A transducer according to claim 19, wherein said cylindrical structure has an axial length being not greater than three times said diameter D.

22. A transducer according to claim 1, further comprising an injection mould for passing elastic materials adapted to be injection moulded, wherein said sleeve member is arranged in a wall of said injection mould with said first end of said sleeve member being flush with an internal surface of said wall.

23. A method for calibrating a transducer comprising:
a hollow sleeve member having an inner peripheral wall,
first means arranged in said sleeve member for measuring pressure of a pressure medium,
second means arranged at a first end of said sleeve member for transmitting pressure characteristics to said first means, and
third means for radially and axially supporting said first and second means within said sleeve member,
wherein said second means is arranged concentrically within said hollow sleeve member with a sealing gap between said second means and the inner wall of said hollow sleeve member, said sealing gap being of a predetermined size so that said gap can cooperate with elastic material of a pressure medium to form a seal for sealing said first means within said hollow sleeve member from said pressure medium, said method comprising the steps of
mounting said transducer on a hydraulic testing device,
applying an adhesive film to said first end of said sleeve member, thereby forming a diaphragm means at least over said sealing gap, and
detecting a predetermined hydraulic pressure on said diaphragm means by said transducer.

24. A transducer for measuring pressure behavior during injection of plastic masses through injection molding tools, consisting of an element with longitudinal stop, which can be fitted straight into standard holes in said injection molding tools, characterized by a force-sensitive element arranged between a radial and axial guiding element, on one hand, and a pressure piston, on the other hand, so that a cylindrical protective sleeve matched to the guiding element surrounds the pressure piston without touching it, and separated by a concentric annular gap which acts as a sealing gap against the plastic masses.

25. Transducer for measuring pressure behavior during injection of plastic masses in accordance with claim 24, characterized by the pressure piston being fitted with a clamping sleeve and an elastic tubular part, so that the measuring element is sealed tightly in the transducer housing under axial preload.

26. Transducer for measuring pressure behavior during injection of plastic masses in accordance with claim 25, characterized by the pressure piston being tensioned against the guiding part with a central clamping element through the annular force measuring element.

27. Transducer for measuring pressure behavior during injection of plastic masses in accordance with claim 24, characterized by a transducer housing with the assembled measuring device being dimensioned so that the very narrow concentric gap is defined as the difference between the diameters of the fitting zone and sealing zone.

28. Transducer for measuring pressure behavior during injection of plastic masses in accordance with claim 24, characterized by the pressure piston being dimensioned so that the front part of the transducer can be machined and adapted to the inside shape of the injection mold.

29. Transducer for measuring pressure behavior during injection of plastic masses in accordance with claim 24, characterized by the front part of the pressure piston being reduced from a diameter $d$ to a smaller diameter $d_1$, the protective sleeve likewise being dimensioned appropriately so that the given sealing gap is again obtained.

30. Transducer for measuring pressure behavior during injection of plastic masses in accordance with claim 24, characterized by the sealing gap being exactly concentric and less than $20\mu m$.

31. Transducer for measuring pressure behavior during injection of plastic masses in accordance with claim 24, characterized by a space behind the sealing gap communicating with atmosphere by known means.

32. Transducer for measuring pressure behavior during injection of plastic masses in accordance with claim 24, characterized by the force-sensitive element consisting of a piezoelectric crystal array which can be exposed to high temperatures.

33. Transducer for measuring pressure behavior during injection of plastic masses in accordance with claim 24, characterized by the ability to employ some other familiar force measuring system as the force-sensitive measuring element.

34. Transducer for measuring pressure behavior during injection of plastic masses in accordance with claim 24, characterized by the assembled measuring device having lengths of three zones, a fitting zone, a measuring zone and a sealing zone being approximately equal, and their total length L being not more than three times the centering diameter D.

35. Transducer for measuring pressure behavior during injection of plastic masses in accordance with claim 24, characterized by the measuring device being fitted straight into the injection mold, so that a fitting hole in the mold has a diameter D of the protective sleeve.

* * * * *